United States Patent [19]

Saito

[11] Patent Number: 6,115,735
[45] Date of Patent: *Sep. 5, 2000

[54] MESSAGE GUARANTY SYSTEM

[75] Inventor: Yoko Saito, Kawasaki, Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/328,885

[22] Filed: Oct. 25, 1994

[30] Foreign Application Priority Data

Oct. 27, 1993 [JP] Japan .................................. 5-268595
Mar. 18, 1994 [JP] Japan .................................. 6-048366

[51] Int. Cl.$^7$ ....................................................... H04L 9/00
[52] U.S. Cl. .......................... 709/200; 709/206; 709/207; 713/178; 713/181; 713/201; 705/76; 705/77; 370/88; 379/94; 371/30
[58] Field of Search .................................. 380/23, 25, 20, 380/49; 370/88; 379/94; 395/575; 371/30; 709/200, 206, 207; 713/178, 181, 201; 705/76, 77

[56] References Cited

U.S. PATENT DOCUMENTS

| Re. 34,954 | 5/1995 | Haber et al. ................................ 380/49 |
| 4,458,109 | 7/1984 | Mueller-Schloer ........................ 380/30 |
| 4,837,798 | 6/1989 | Cohen et al. .............................. 379/88 |
| 4,885,777 | 12/1989 | Takaragi et al. .......................... 380/30 |
| 5,018,196 | 5/1991 | Takaragi et al. .......................... 380/30 |
| 5,022,080 | 6/1991 | Durst et al. ................................ 380/23 |
| 5,136,647 | 8/1992 | Haber et al. .............................. 380/49 |
| 5,157,726 | 10/1992 | Merkle et al. ........................... 713/176 |
| 5,303,303 | 4/1994 | White ........................................ 380/49 |
| 5,339,361 | 8/1994 | Schwalm et al. .......................... 380/23 |
| 5,349,642 | 9/1994 | Kingdon .................................... 380/25 |
| 5,408,642 | 4/1995 | Mann ...................................... 395/575 |
| 5,442,708 | 8/1995 | Adams, Jr. et al. ...................... 380/49 |
| 5,444,782 | 8/1995 | Adams, Jr. et al. ...................... 380/49 |
| 5,455,407 | 10/1995 | Rosen ..................................... 235/380 |
| 5,502,766 | 3/1996 | Boebert et al. ........................... 380/25 |
| 5,621,727 | 4/1997 | Vaudreuil ................................. 370/60 |

Primary Examiner—Pinchus M. Laufer
Assistant Examiner—Hrayr A. Sayadian
Attorney, Agent, or Firm—Antonelli, Terry, Stout & Kraus, LLP

[57] ABSTRACT

A message guaranty system for having a reliable third party (evidence preparing server) prepare evidence information attesting to the transmission and reception of a message by a transmitting and a receiving terminal. When the transmitting terminal furnishes the target message with evidence information before transmitting them to the destination, the system attests to the transmission and reception of that message once they are completed. When a message is to be sent illustratively from a workstation (WS) 1 to a workstation (WS) 2, the third-party evidence preparing server on the network first prepares transmission evidence based on a request from the WS 1 and sends it to the WS 1. The WS 1 sends the message along with the evidence to the WS 2. The evidence preparing server then prepares reception evidence based on a request from an evidence verifying server (a third party) acting for the WS 2. The reception evidence thus prepared is retained by the evidence preparing server and is also returned to the evidence varying server. The evidence verifying server retains the reception evidence. When an application program on the WS 1 requests verification of the reception evidence, the evidence verifying means verifies the presence of the reception evidence and returns the result of the verification to the WS 1.

22 Claims, 12 Drawing Sheets

MESSAGE GUARANTY SYSTEM

BACKGROUND OF THE INVENTION

The present invention relates to a message guaranty system and, more particularly, to a message guaranty system capable of guaranteeing that messages have indeed been transmitted and received between terminals connected on a network system.

A number of conventional methods exist for guaranteeing the transmission and reception of messages between workstations connected on a network system. One such method involves having the transmitting and receiving workstations each manage a message start serial number and a message end serial number which are assigned to each message sent from one side to the other. Another method requires establishing a sequence in which the receiving workstation returns an acknowledgement in response to each message received from the transmitting workstation.

More specifically, the former conventional method (of managing message serial numbers) requires that four serial numbers, i.e., the message start and message end serial assigned to each of the transmitting and receiving terminals, coincide with one another before transmission or reception of any message. When the transmitting terminal transmits the message, the receiving terminal increments its message start serial number by 1. With the message received, the receiving terminal increments its message start serial number by 1. The receiving terminal then processes the message. With the message processing completed, the receiving terminal increments its message end serial number by 1 and returns an acknowledgement message to the transmitting terminal. Having received the acknowledgment message, the transmitting terminal increments its message end serial number by 1. This terminates the entire processing of message transmission/reception. This kind of message serial number management is carried out under the NIF/OSI (Network Interface Feature/Open Systems Interconnection) protocol. If there occurs a serial number mismatch between the transmitting and the receiving terminal, an error is suspected to have occurred in the message processing.

The latter conventional method (of establishing an acknowledgement sequence) requires that the receiving terminal must always return an acknowledgement message (ACK) in response to the message sent from the transmitting terminal. The return of the ACK message is supposed to guarantee an error-free message transmission.

A further method is proposed by Japanese Patent Laid-open No. Hei 4-227154 (cited reference 1). The proposed method involves furnishing a securely managed encryption key and a powerful encryption algorithm whereby the transmitting terminal furnishes the target message with a token constituting a collection of specific information. Using the same encryption key and algorithm, the receiving terminal prepares an authentication token (a collection of information for authentication purposes) by which the token of the received message is checked for authenticity. If any dispute occurs between the transmitting and receiving parties regarding the transmission or reception of a particular message, the two parties alone are responsible for resolving it.

The above conventional methods are effective in detecting mismatches in message processing but fail to provide for eventualities in which the transmitting or receiving party denies having transmitted or received a specific message. Although the system of the cited reference 1 provides high degrees of message authentication, the fact that any dispute is left to be resolved not by any reliable third party but only by the parties concerned does not make the system suitable for an open, distributed environment.

SUMMARY OF THE INVENTION

It is therefore an object of the present invention to overcome the above and other deficiencies and disadvantages of the prior art and to provide a message guaranty system having a third party intervene in the transmission and reception of a message by a transmitting and a receiving terminal, the system guaranteeing that every message it mediated was indeed transmitted by the transmitting terminal and received by the receiving terminal. This invention differs from that of the cited reference 1 in that this invention gets a reliable third party in a neutral position to prepare evidence information regarding each message handled and that any dispute is resolved by the third party verifying the authenticity of the evidence information about the message in question.

It is another object of the present invention to provide a message guaranty system offering a delayed delivery service that takes a message from a transmitting terminal and delivers the message to its destination on behalf of the transmitting terminal, the system verifying the authenticity of the evidence information regarding any message so delivered which may be disputed between a plurality of terminals. When the reliable third party delivers a message to its destination on behalf of the transmitting terminal, the transmission and reception of the message are carried out more securely than ever. The inventive system acting as the thirty party effectively guarantees to any transmitting terminal both the transmission of the message in question and the reception thereof by the intended receiving terminal.

In achieving the foregoing and other objects of the present invention, there is provided a message guaranty system featuring the following points:

(1) The inventive message guaranty system for use with a plurality of terminals connected on a network furnishes each message sent from a transmitting to a receiving terminal with evidence information which is prepared by a third party and which attests to the transmission and reception of the message, whereby the transmission of any disputed message by the transmitting terminal or the reception of that message by the receiving terminal is subsequently certified.

(2) The evidence information includes the terminal name of the transmitting terminal transmitter identifier), the terminal name of the receiving terminal (receiver identifier), time of message transmission, and the message length.

(3) The message guaranty system of the invention comprises evidence information preparing means for having a reliable third party prepare evidence information attesting to the transmission and reception of any message within the network, and evidence information converting means for converting the evidence information into an encryption format or other suitable form that will thwart any unscrupulous attempts to forge or falsify that information.

(4) The message guaranty system of the invention includes, within the connected network, delayed delivery means for transmitting a message to the receiving terminal on behalf of the transmitting terminal when such transmission is requested by the latter, so as to ensure more secure delivery of that message.

(5) The message guaranty system of the invention includes third party verification means for verifying the authenticity of evidence information about a particular message when such verification is requested by a plurality of terminals.

In operation, the message guaranty system of the above constitution offers the following advantages:

(1) According to the invention, any message sent from the transmitting terminal to the receiving terminal is furnished with evidence information which, prepared by the reliable third party, attests to the transmission and reception of that message. The highly reliable evidence information demonstrates unfailingly whether a particular message was actually delivered from one party to another. This feature facilitates the resolution of any message-related dispute between two contending parties.

(2) The evidence information preparing means of the invention prepares evidence information on the basis of such message-related information as the terminal name of the transmitting terminal (transmitter identifier), the terminal name of the receiving terminal (receiver identifier), time of message transmission, and the message length. Analyzing this evidence information provides a highly accurate verdict on the disputed message.

(3) The evidence information converting means of the invention converts the evidence information into an encryption format or other suitable form that will thwart any malicious or unscrupulous attempts to forge or falsify that information. This feature allows the inventive system to attest to the transmission and reception of any message with more certainty than ever.

(4) As mentioned, any message sent from the transmitting terminal to the receiving terminal is equipped with evidence information which is prepared and converted by the evidence information preparing and converting means and which attests to the transmission and reception of that message This evidence information demonstrates whether a particular message was actually delivered from one party to another. If more security is desired in delivering a message, the delayed delivery means of the invention is used to transmit a message along with its evidence information from an evidence server comprising that means directly to the receiving terminal on behalf of the transmitting terminal. Interposed between the transmitting and the receiving terminal, the delayed delivery means offers more secure delivery of messages therebetween and directly attests to the transmission and reception of any of the messages so delivered.

(5) If a message-related dispute occurs between a plurality of communicating terminals and if these terminals request verification of the evidence information regarding the disputed message, the verification means of the invention verifies the authenticity of the evidence information in question.

Other objects and advantages of the invention will become apparent from the examination of the present disclosure.

DESCRIPTION OF THE PREFERRED EMBODIMENTS

Figure 1:
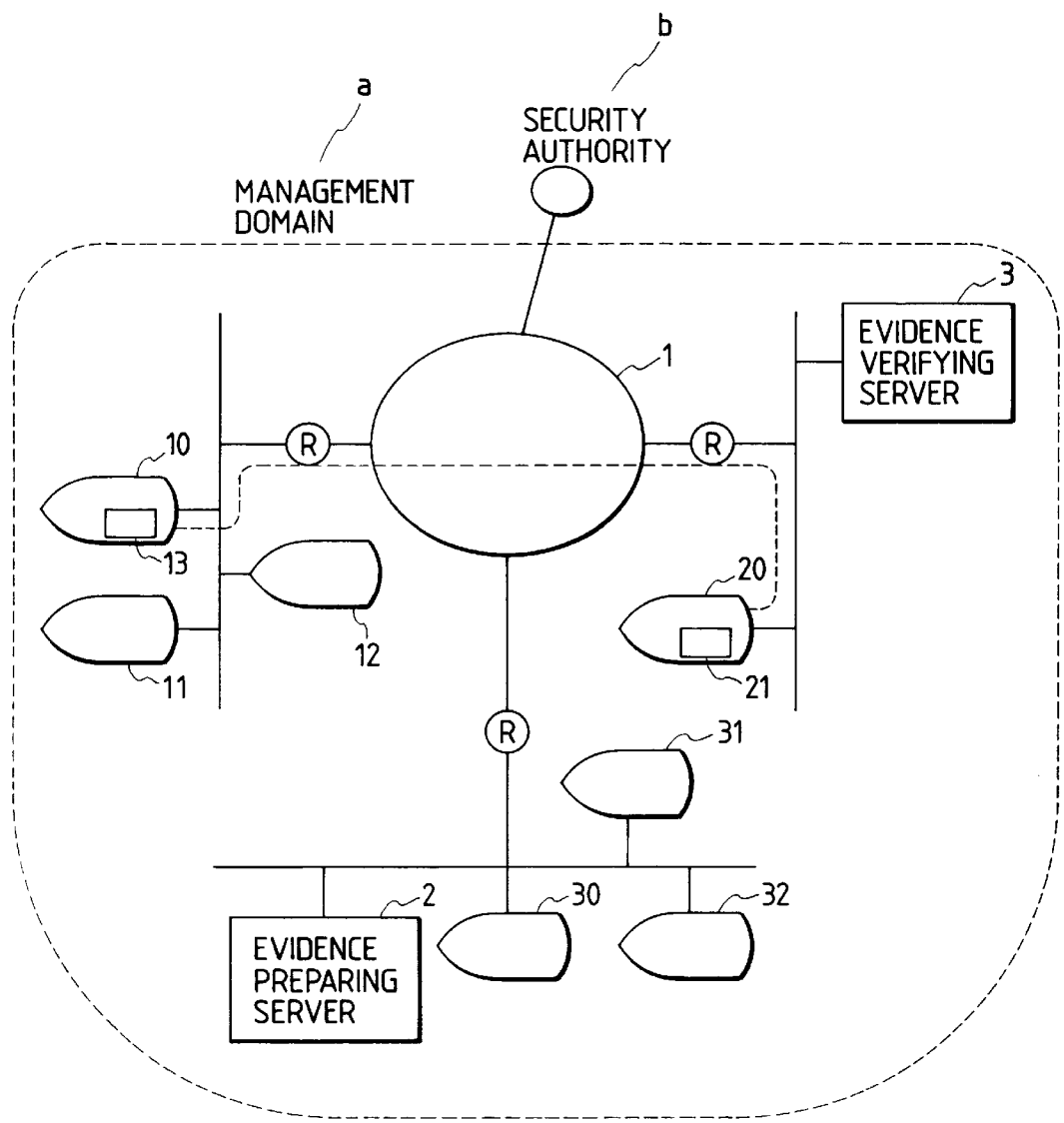
FIG. 1 is a schematic diagram of a message guaranty system practiced as a first embodiment of the invention.

Preferred embodiments of the invention will now be described with reference to the accompanying drawings. FIG. 1 is a schematic diagram of a message guaranty system practiced as a first embodiment of the invention and including a network system 1. In FIG. 1, the network 1 is connected with an evidence preparing server 2, an evidence verifying server 3, and workstations (each called a WS) 10 through 12, 20, and 30 through 32. The first embodiment is characterized in that the servers 2 and 3 are each constituted not by any configured workstation but by a reliable third party. Although the first embodiment has the evidence preparing server 2 and the evidence verifying serve 3 implemented separately for explanatory purposes, they may be integrated in a single server unit. When an application program (called an AP) 13 started on a WS 10 illustratively transmits a message M1 to an AP 21 on a WS 20, the evidence preparing server 2 prepares evidence information (or simply called evidence) E1 attesting to the transmission of the message M1 from the AP 13 on the WS 10 to the AP 21 on the WS 20. How the evidence preparing server 2 prepares the evidence E1 will be described later in detail with reference to FIG. 4.

Figure 2:
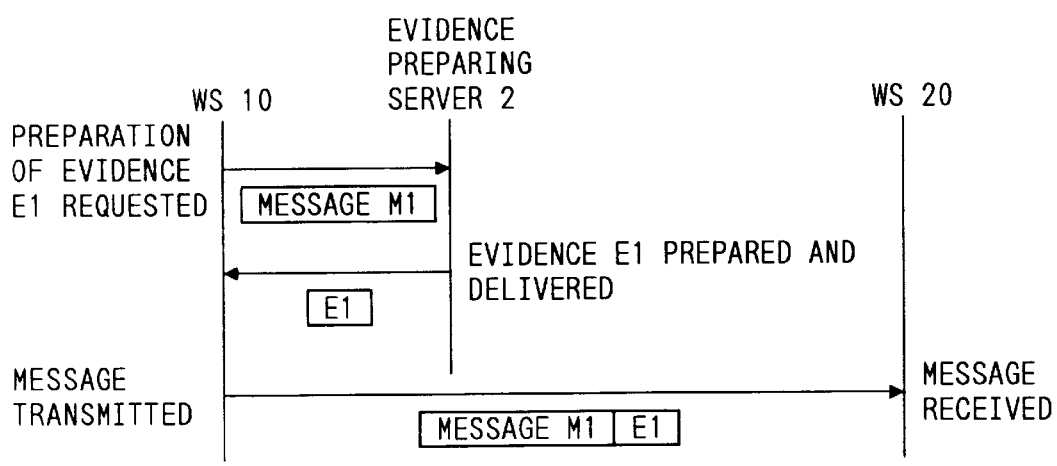
FIG. 2 is a view outlining the process in which the first embodiment prepares evidence E1 attesting to the transmission of a message M1.

The WS 10 furnishes the target message M1 with the evidence E1 prepared by the evidence preparing server 2 and transmits the message along with the evidence to the WS 20 (to be described later with reference to FIG. 2).

The evidence verifying server 3 acts to verify the authenticity of the evidence information thus prepared. Such verification of evidence is generally conducted in case of a message processing discrepancy resulting in a dispute between, say, the WS 10 and the WS 20. It is also possible for the WS 20 to request evidence verification upon receipt of the message M1 along with the evidence E1. One such example is that of FIG. 5, to be described later, in which the AP 21 on the WS 20 requests the evidence verifying server 3 to verify the authenticity of the evidence E1.

Figure 3:
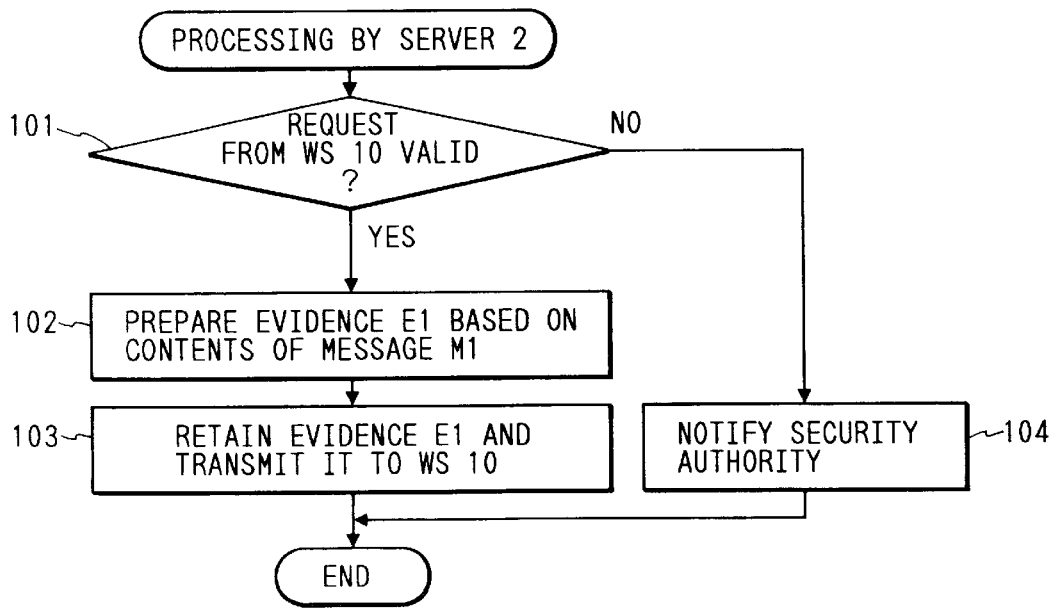
FIG. 3 is a flowchart of steps constituting the process in which to prepare the evidence E1 attesting to the transmission of the message M1.

How the evidence E1 for the message M1 is prepared will now be described with reference to FIG. 2 and to the flowchart of FIG. 3. When the AP 13 on the WS 10 requests the evidence preparing server 2 to prepare the evidence E1 for the message M1, the server 2 checks to see if the request is valid (step 101). If the request is found to be valid, the evidence preparing server 2 accepts the message M1 and prepares the evidence E1 based on the message contents (step 102). The evidence preparing server 2 retains the evidence E1 thus prepared (how to retain it is a local matter) and returns the same evidence to the WS 10 (step 103). If the request made by the AP 13 is found to be invalid in step 101, that request is reported to a security authority (step 104). The security authority is provided on the network for the purpose of having overall control on message-related problems on the network. The security authority is responsible for proper enforcement of security-related rules and regulations (i.e., security policy) within the management domain indicated in FIG. 1. If a security breach is detected within the management domain (in step 101), the evidence preparing server 2 must notify the security authority of that breach. The kind of security policy and the manner of implementing it, as well as ways to analyze security breaches, are not directly relevant to this invention and will not be discussed herein.

Figure 4:
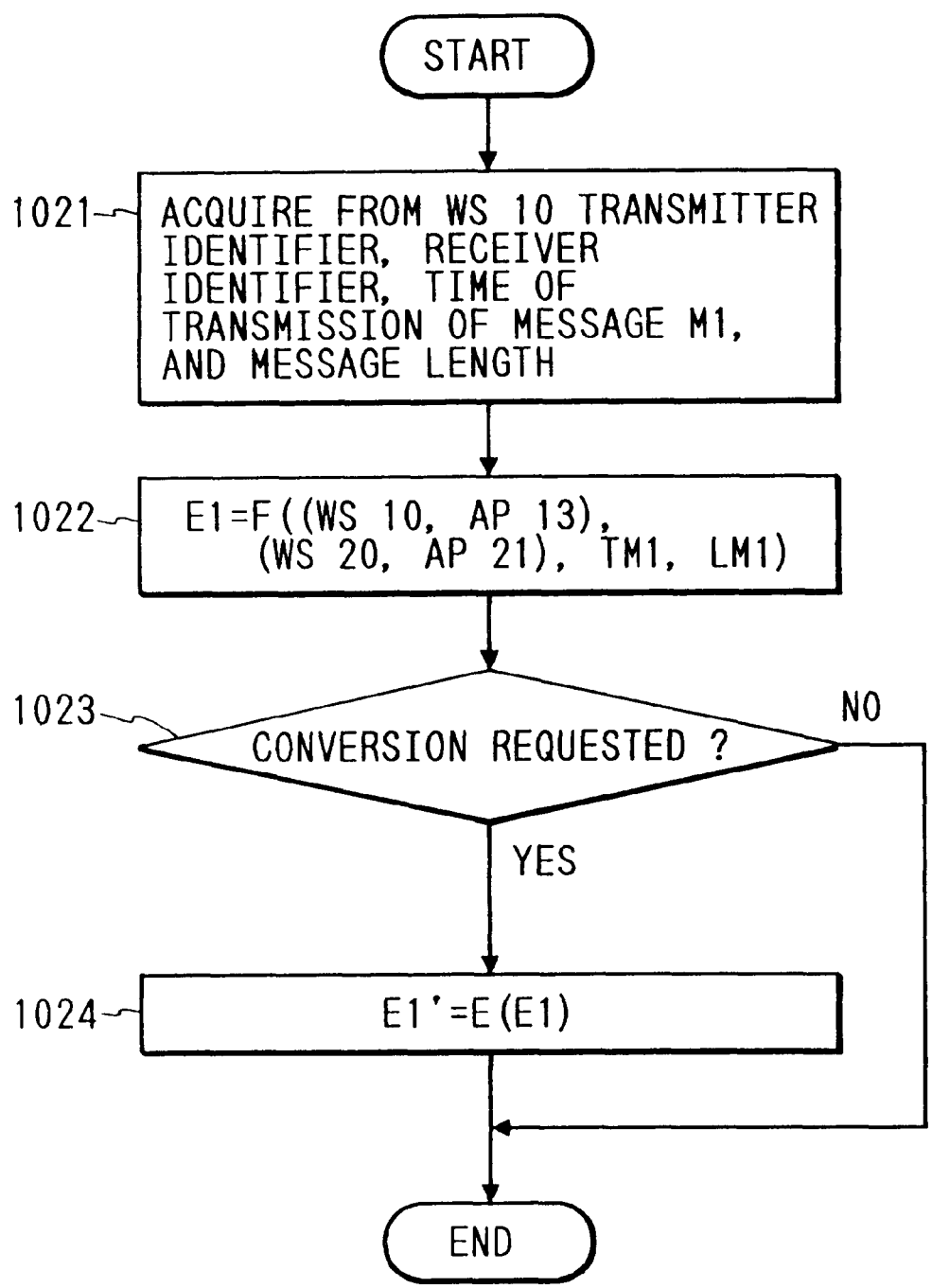
FIG. 4 is a flowchart of steps detailing what takes place in step 102 of FIG. 3.

The process in which the evidence preparing server 2 prepares the evidence E1 (i.e., step 102) will now be described in more detail with reference to FIG. 4. The evidence preparing server 2 acquires from the WS 10 information comprising the message name, the transmitter identifier (identifying, e.g., WS 10 paired with AP 13), the receiver identifier (identifying, e.g., WS 20 paired with AP 21), the time of transmission of the message M1 (TM1), and the length of the message M1 (TL1) (step 1021). The evidence E1 is prepared in accordance with a function (F) for preparing evidence information based on these items of information. (step 1022) If it is necessary to convert the evidence information into an encryption format immune to forgery or falsification (step 1023), the evidence preparing server 2 encrypts the evidence E1 using an encryption algorithm (E) known only to this server (step 1024). The WS 10 furnishes the target message M1 with evidence E1' (E(E1)) prepared by the evidence preparing server 2, and transmits the message M1 along with the evidence to the WS 20.

Figure 5:
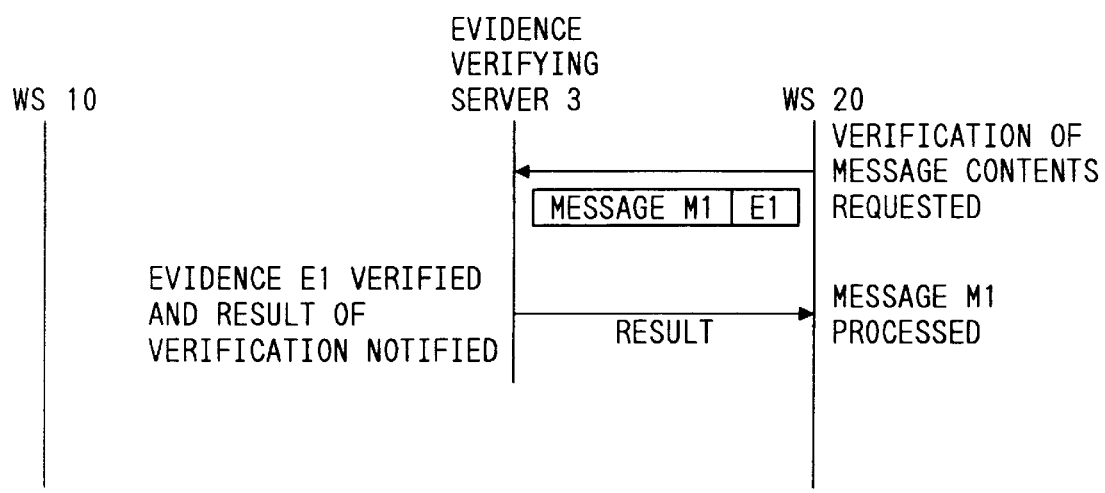
FIG. 5 is a view illustrating the process in which the first embodiment verifies the evidence E1 attesting to the transmission of the message M1.
Figure 6:
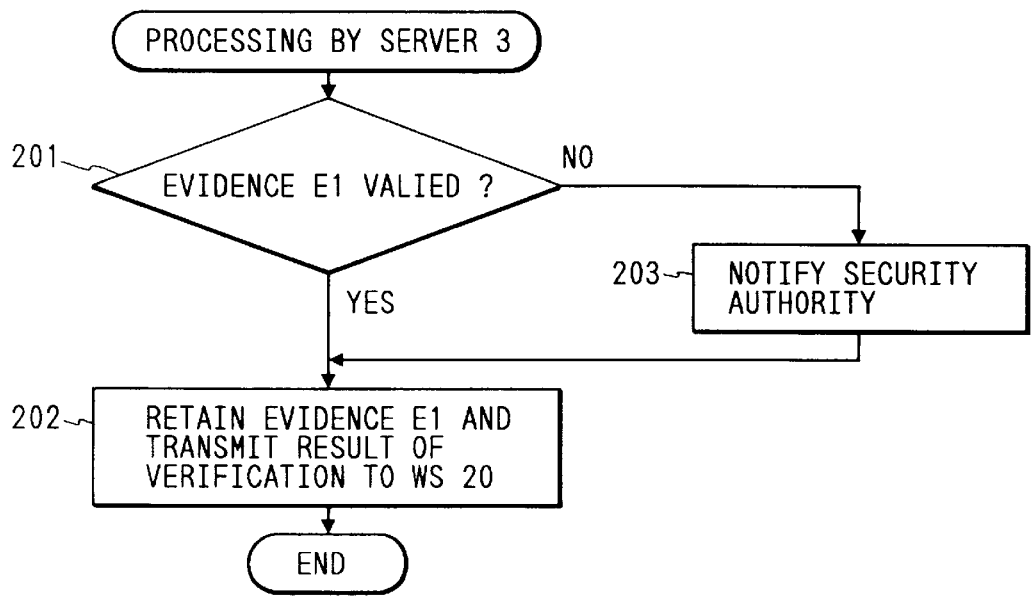
FIG. 6 is a flowchart of steps constituting the process in which to verify the evidence E1 attesting to the transmission of the message M1.

How the evidence E1 of the message M1 is verified will now be described with reference to FIGS. 5 and 6. In response to a request by the AP 21 on the WS 20 for verification of the evidence E1, the evidence verifying server 3 receives the message M1 and checks to see if the evidence E1 attached to the message M1 is valid (step 201). If the evidence E1 is found to be valid, the evidence verifying server 3 retains the evidence E1 (how to retain it is a local matter) and returns the result of the verification to the WS 20 (step 202). If the evidence E1 is found to be invalid in step 201, the security authority is notified thereof (step 203).

Figure 7:
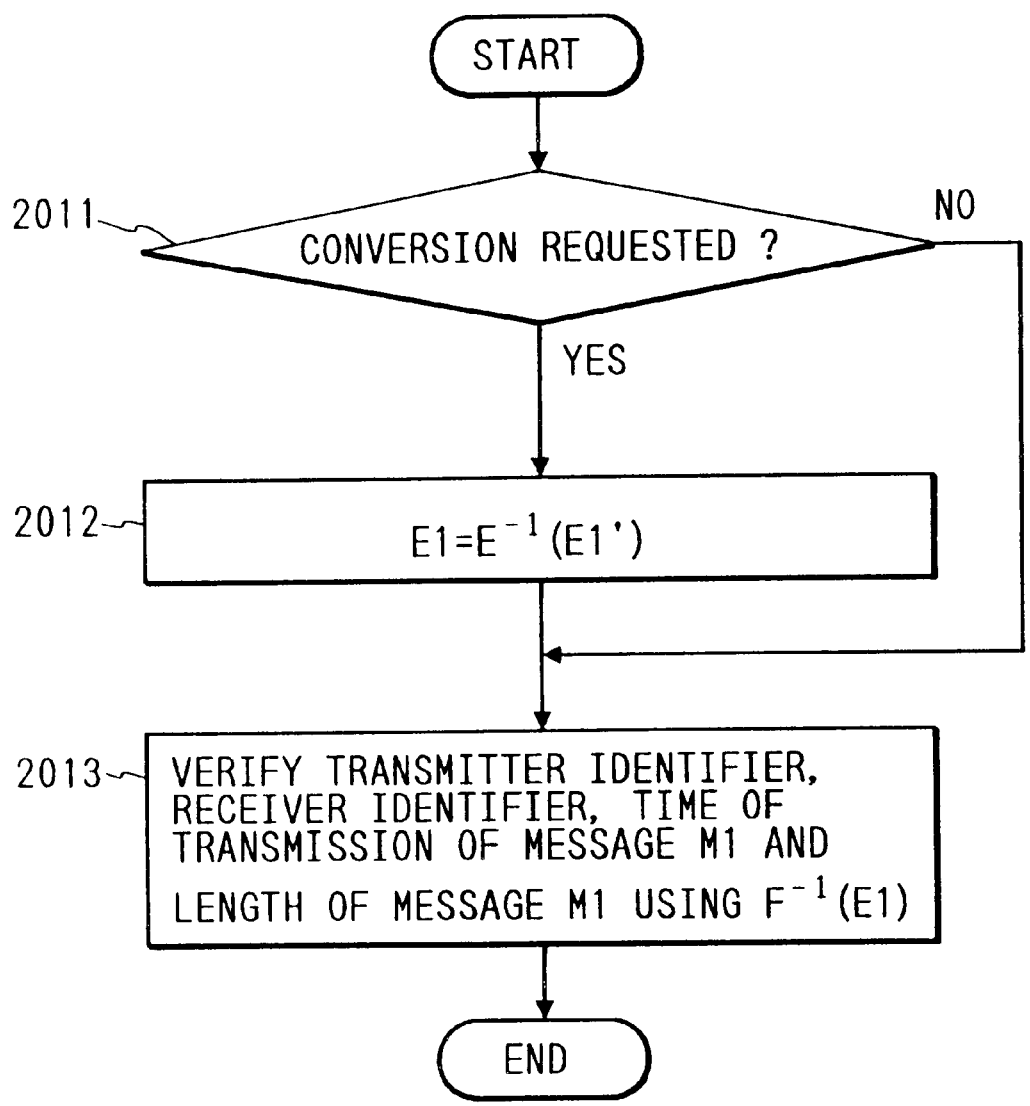
FIG. 7 is a flowchart of steps detailing what takes place in step 201 of FIG. 6.

The process in which the evidence verifying server 3 verifies the evidence E1 (i.e., step 201) is depicted in more detail in FIG. 7. Where the evidence preparing server 2 and the evidence verifying server 3 exist as different server units, it is necessary to install beforehand a common encryption algorithm in both servers. In that case, the evidence verifying server 3 needs to be supplied, in advance during the processing of FIG. 4, with the evidence E1 prepared by the evidence preparing server 2. The evidence verifying server 3 checks to see if conversion (i.e., decryption) of the evidence E1 attached to the message M1 from the WS 20 is requested. If such a request is found to have been made, the evidence verifying server 3 decrypts the evidence E1 using the encryption algorithm (E) (steps 2011 and 2012). The information contained in the decrypted evidence E1 is then analyzed and checked, using a function for verifying evidence information ($F^{-1}$), against such items of information as the transmitter identifier (identifying, e.g., WS 10 paired with AP 13), the receiver identifier (identifying, e.g., WS 20 paired with AP 21), the time of transmission of the message M1, and the length of the message M1 (step 2013). With these items of information verified, the evidence verifying server 3 determines whether the evidence E1 is valid as evidence information relevant to the message M1. At this point, the evidence E1 from the WS 20 may alternatively be checked against the evidence E1 received directly from the evidence preparing server 2 (prepared in the processing of FIG. 4) for coincidence. The coincidence of the evidence from the two different sources should enable more accurate message verification.

Figure 8:
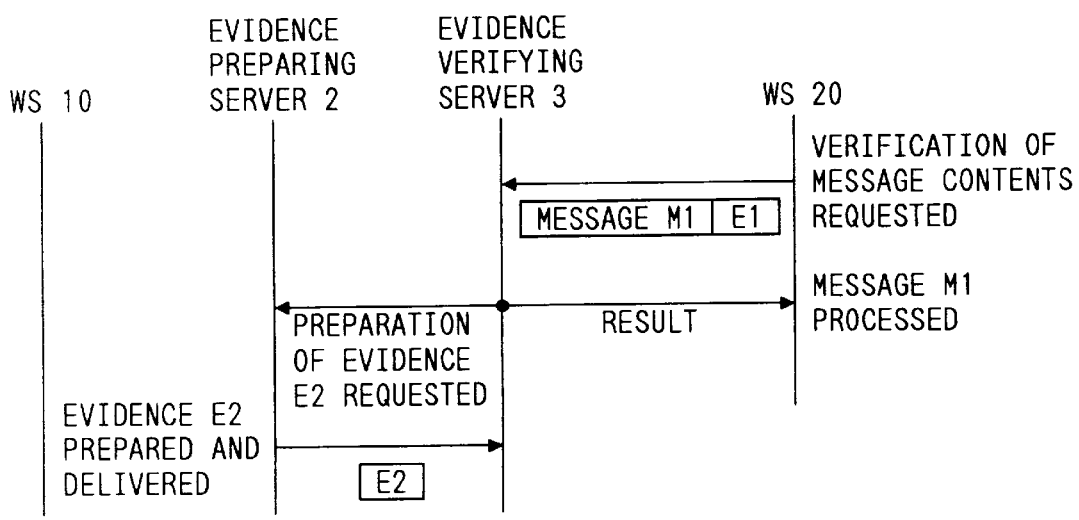
FIG. 8 is a view outlining the process in which the first embodiment prepares evidence E2 attesting to the reception of the message M1.

After step 202, the evidence verifying server 3 returns to the WS 20 the result of verification of the evidence E1, and requests the evidence preparing server 2 to prepare information (herein called evidence E2) attesting to the reception of the message M1 by the WS 20 from the WS 10. The sequence in which to request the preparation of the evidence E2 is shown in FIG. 8.

Figure 9:
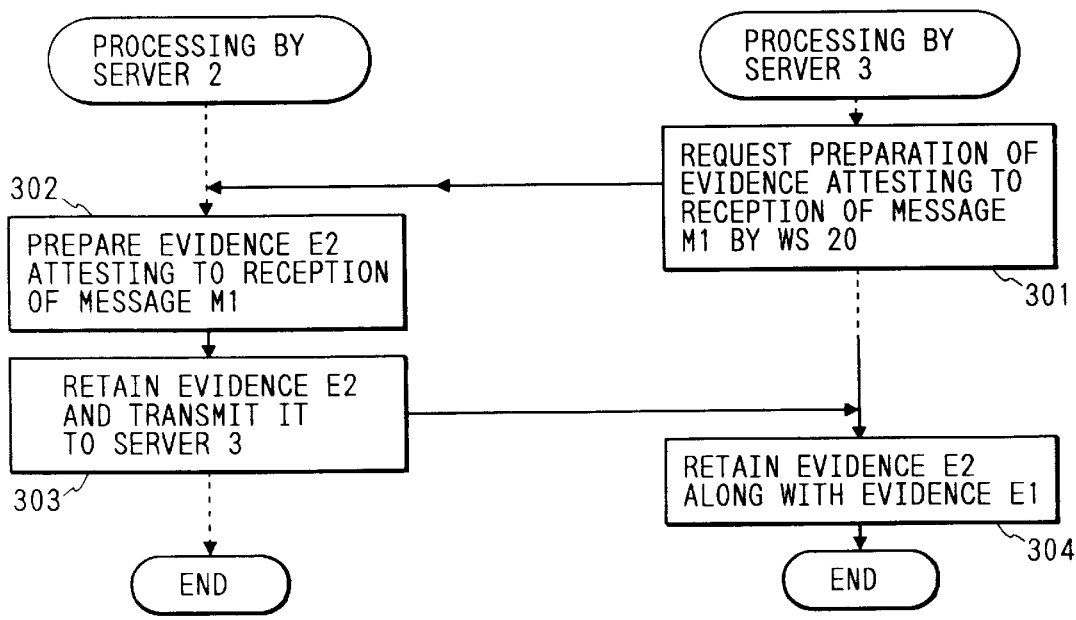
FIG. 9 is a flowchart of steps in which to prepare the evidence E2 attesting to the reception of the message M1.

How the evidence E2 attesting to the reception of the message M1 is prepared will now be described with reference to FIGS. 8 and 9. It may happen that the system is so configured that the evidence preparing server 2 and evidence verifying server 3 are implemented in the same server unit. In that case, all exchanges between the two servers in FIGS. 8 and 9 can be omitted.

The evidence verifying server 3 first requests the evidence preparing server 2 to prepare the evidence E2 attesting to the reception of the message M1 by the WS 20 from the AP 13 on the WS 10 (step 301). In turn, the evidence preparing server 2 prepares the evidence E2 attesting to that effect (step 302). Concrete steps to prepare the evidence E2 comply with the processing of FIG. 4. It should be noted that in place of TM 1 (time of transmission of the message M1), the time at which the WS 20 received the message M1 is designated. The evidence preparing server 2 retains the evidence E2 (how to retain it is a local matter) and returns the same evidence to the evidence verifying server 3 (step 303). The evidence verifying server 3 retains the received evidence E2 along with the evidence E1 stored previously (step 304).

Although the evidence verifying server 3 requests the evidence preparing server 2 to prepare the evidence E2 in the above example, the AP 21 on the WS 20 may alternatively request the evidence preparing server 2 to prepare the evidence E2.

Figure 10:
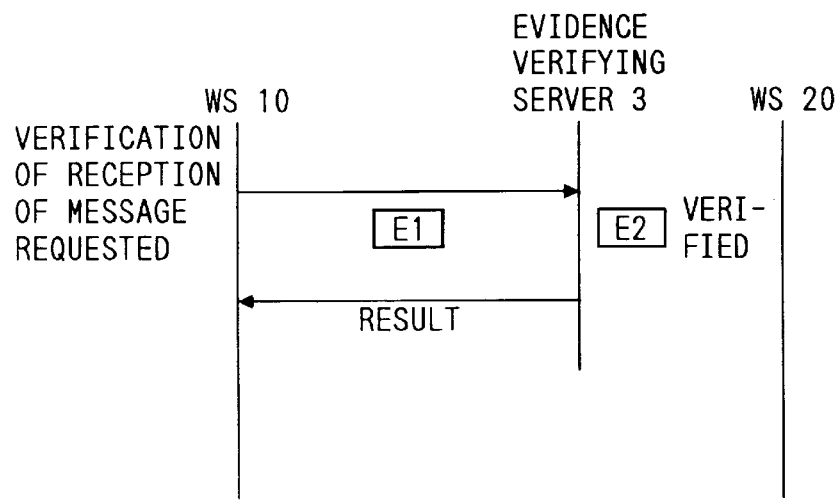
FIG. 10 is a view illustrating the process in which the first embodiment verifies the evidence E2 attesting to the reception of the message E1.
Figure 11:
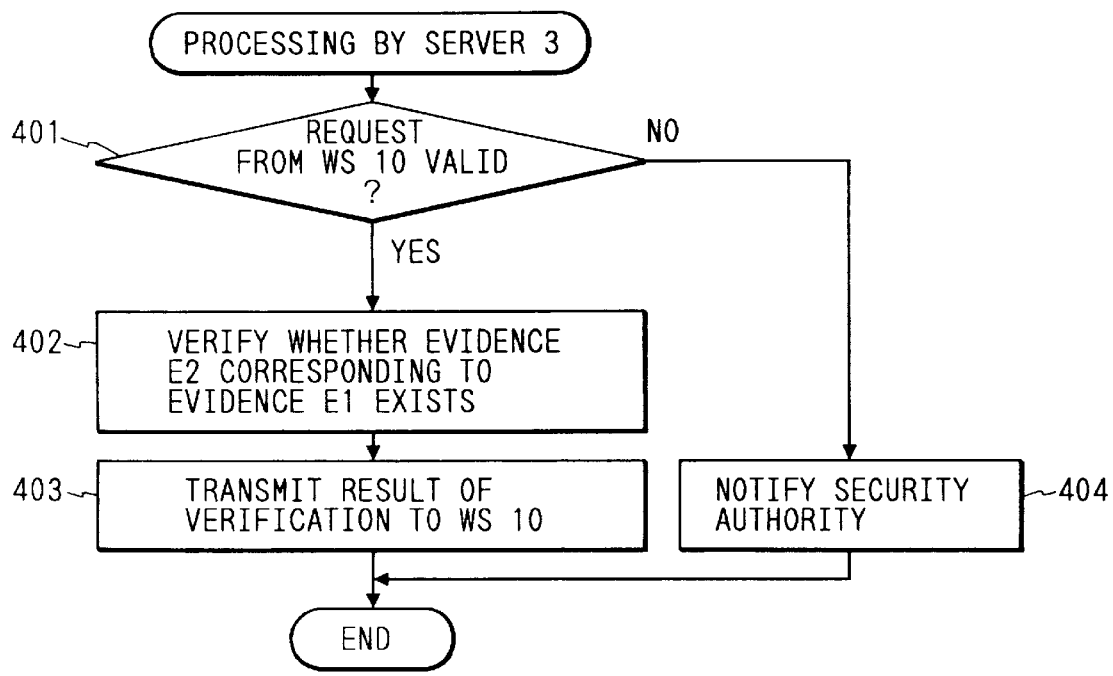
FIG. 11 is a flowchart of steps constituting the process in which to verify the evidence E2 attesting to the reception of the message E1.

How to attest to the transmission and reception of a message will now be described with reference to FIGS. 10 and 11. FIG. 10 is a view illustrating the process in which the first embodiment verifies the evidence E2 attesting to the reception of the message E1. If a message processing discrepancy occurs and results in a dispute between the WS 10 and the WS 20, the processing of FIG. 10 is generally carried out for verification. FIG. 11 is a flowchart of steps corresponding to the processing of FIG. 10. Given a request from the AP 13 on the WS 10 for verification of the evidence E2, the evidence verifying server 3 checks to see if the request is valid (step 401). If the request is found to be valid, the evidence verifying server 3 receives the evidence E1 from the WS 10 and checks to see if there exists evidence E2 corresponding to the evidence E1 (step 402). The evidence verifying server 3 then returns to the WS 10 the result of the verification attesting to the presence or the absence of the evidence E2 (step 403). If the request is found to be invalid in step 401, the security authority is notified thereof (step 404). If the result from the evidence verifying server 3 indicates the presence of the evidence E2 corresponding to the evidence E1, the WS 10 knows that the WS 20 indeed received the message M1.

Figure 12:
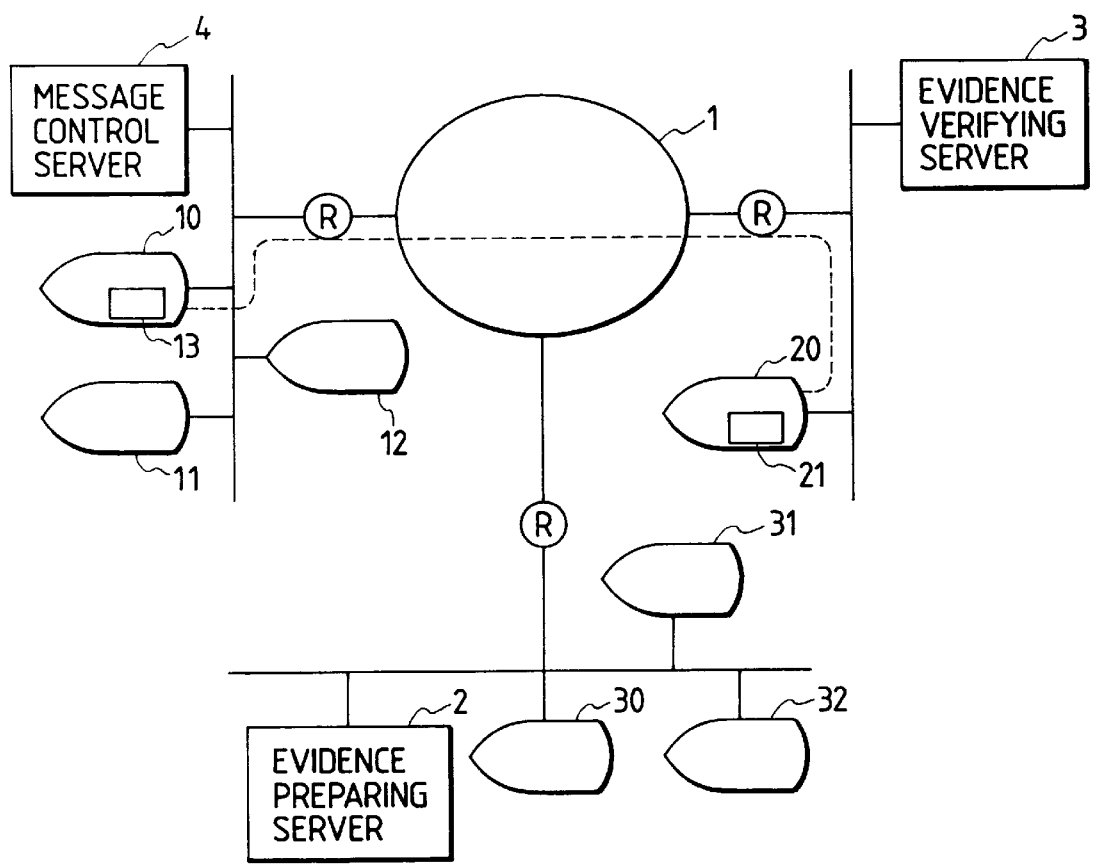
FIG. 12 is a schematic diagram of a message guaranty system practiced as a second embodiment of the invention.

A second embodiment of the invention will now be described with reference to FIGS. 12 through 20. FIG. 12 is a schematic diagram of a message guaranty system practiced as the second embodiment of the invention and including a network system 1. In FIG. 12, the network 1 is connected with a message control server 4, an evidence preparing server 2, an evidence verifying server 3, and workstations (WS) 10 through 12, 20, and 30 through 32. The second embodiment differs from the first embodiment in that the second includes the message control server 4. The rest is the same as the first embodiment. The message control server 4 provides control illustratively on the transmission and reception of messages between the AP 13 on the WS 10 and the AP 21 on the WS 20, on the evidence preparing server 2 and on the evidence verifying server 3. Although the second embodiment has a plurality of servers implemented separately for explanatory purposes, they may be integrated in one or two server units.

Figure 13:
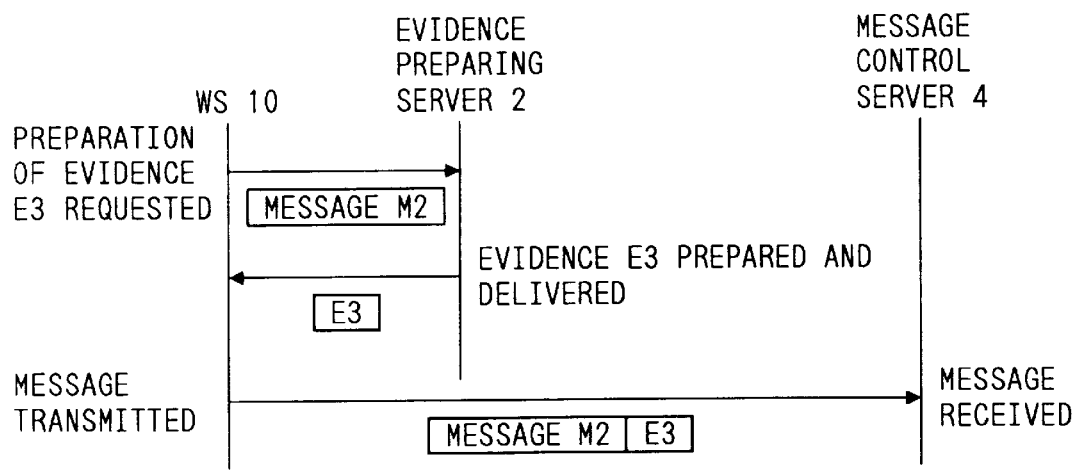
FIG. 13 is a view outlining the process in which the second embodiment prepares evidence E3 attesting to the transmission of a message M2.
Figure 14:
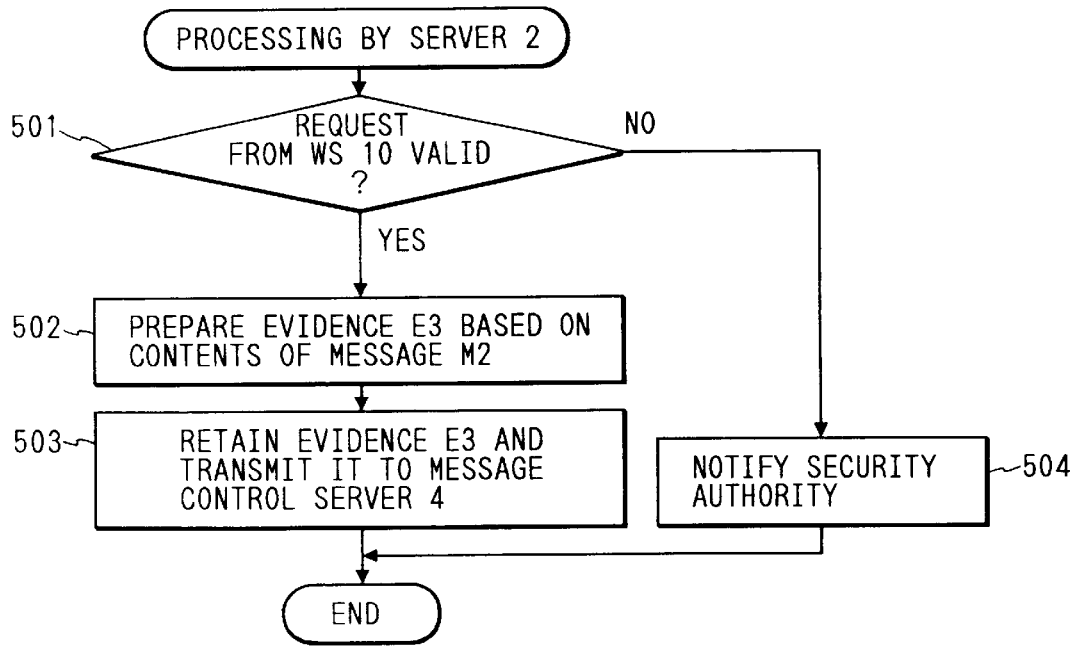
FIG. 14 is a flowchart of steps in which to prepare the evidence E3 attesting to the transmission of the message M2.

How to prepare evidence E3 for a message M2 will now be described with reference to FIGS. 13 and 14. When the AP 13 on the WS 10 requests the evidence preparing server 2 to prepare the evidence E3 attesting to the transmission of the message M2 from the AP 13, the server 2 checks to see if that request is valid (step 501). If the request is found to be valid, the evidence preparing server 2 receives the message M2 and prepares the evidence E3 based on the message contents (step 502). The contents of the evidence E3 are the same as those of the evidence E1 and will riot be described further. The evidence preparing server 2 retains the evidence E3 thus prepared and returns the same evidence to the WS 10 (step 503). Where the evidence preparing server 2 and the evidence verifying server 3 are separately implemented, the evidence preparing server 2 sends the evidence E3 to the evidence verifying server 3 as well. If the request by the AP 13 is found to be invalid in step 501, the security authority is notified thereof (step 504).

The WS 10 furnishes the message M2 with the evidence E3 prepared by the evidence preparing server 2 and transmits the message M2 along with the evidence E3 to the message control server 4. This procedure is effective where the transmission of a message from the WS 10 to the WS 20 is delegated to the message control server 4 to ensure higher levels of security.

Figure 15:
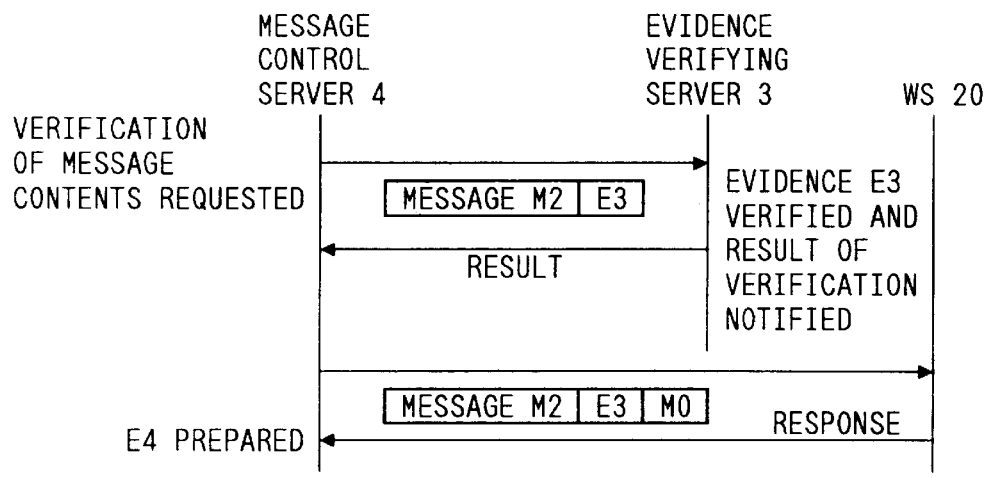
FIG. 15 is a view illustrating the process in which the second embodiment verifies the evidence E3 attesting to the transmission of the message M2.
Figure 16:
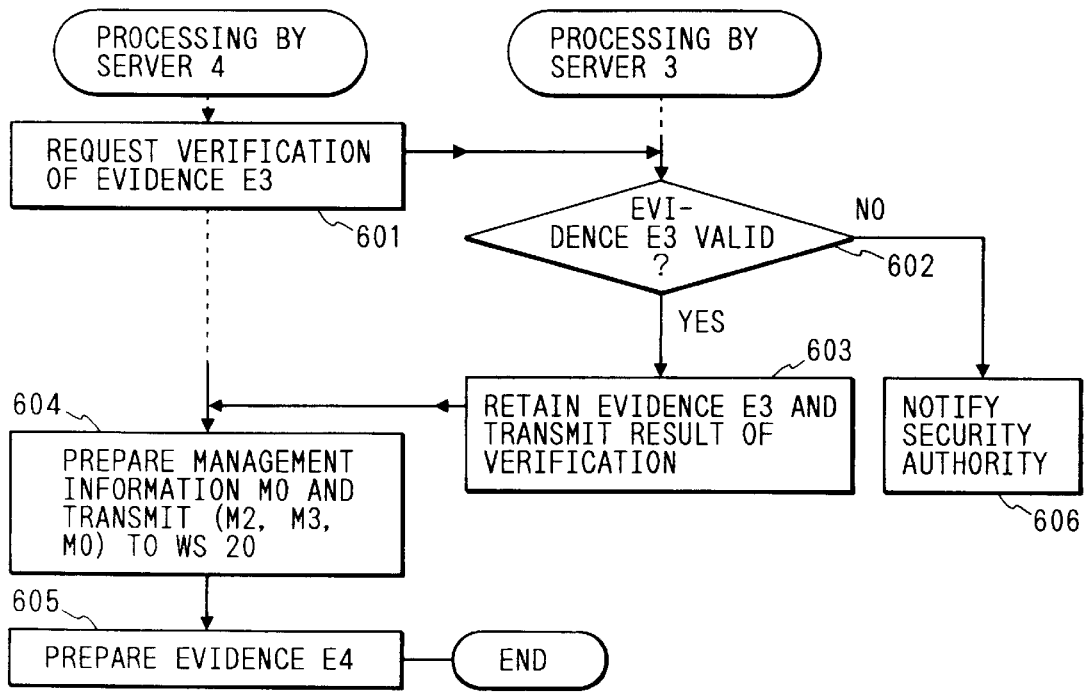
FIG. 16 is a flowchart of steps constituting the process in which to verify the evidence E3 attesting to the transmission of the message M2.

FIG. 15 is a view illustrating the process in which the second embodiment verifies the evidence E3 attesting to the transmission of the message M2. What takes place in the setup of FIG. 15 will be described below in more detail with reference to the flowchart of FIG. 16. The message control server 4 requests the evidence verifying server 3 to verify the evidence E3 (step 601). When so requested by the message control server 4, the evidence verifying server 3 checks to see if the evidence E3 attached to the message M3 is valid (step 602). The method of verifying the evidence E3 is the same as that of verifying the evidence E1 described with reference to FIG. 7 and will not be described further. If the result of the verification is correct, the evidence verifying server 3 retains the evidence E3 and returns the result of the verification to the message control server 4 (step 603). The message control server 4 prepares management information MO for its own management, attaches the information MO to the message M2 and transmits the same information to the WS 20 (step 604). The management information MO serves as evidence information attesting to the fact that the message transmission from the WS 10 to the WS 20 is delegated to the message control server 4. In that respect, the management information MO complies with the format determined by the message control server 4. Illustratively, the information includes such items as the transmitting terminal name, receiving terminal name, message ID, and ID of the message control server 4. Furthermore, with the message M2 delivered to the WS 20, the message control server 4 prepares information (called evidence E4) attesting to the reception of the message M2 by the WS 20 from the WS 10 (step 605). Where the servers 2, 3 and 4 are separately implemented, the message control server 4 may get the evidence preparing server 2 to prepare the evidence E4. The evidence E4 thus prepared is sent to both the message control server 4 and the evidence verifying server 3 for storage. On the other hand, if the evidence verifying server 3 finds the evidence E3 invalid following the receipt of the request for its verification, the evidence verifying server 3 notifies the security authority thereof (step 606).

For delivery of the message from the message control server 4 to the WS 20, the message control server 4 may additionally furnish the message with information for ascertaining the willingness on the part of the WS 20 to really perform the transaction.

Figure 17:
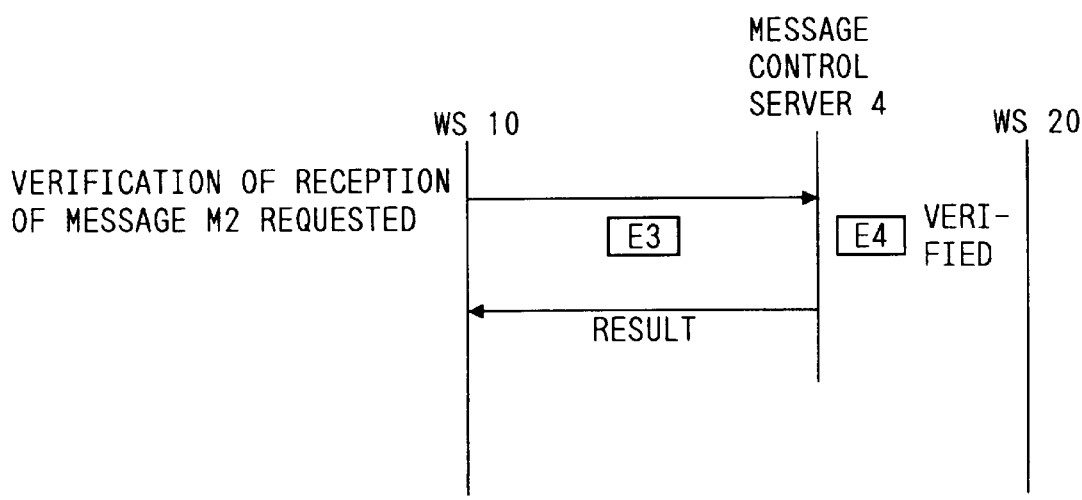
FIG. 17 is a view illustrating the process in which the second embodiment verifies evidence E4 attesting to the reception of the message E2.
Figure 18:
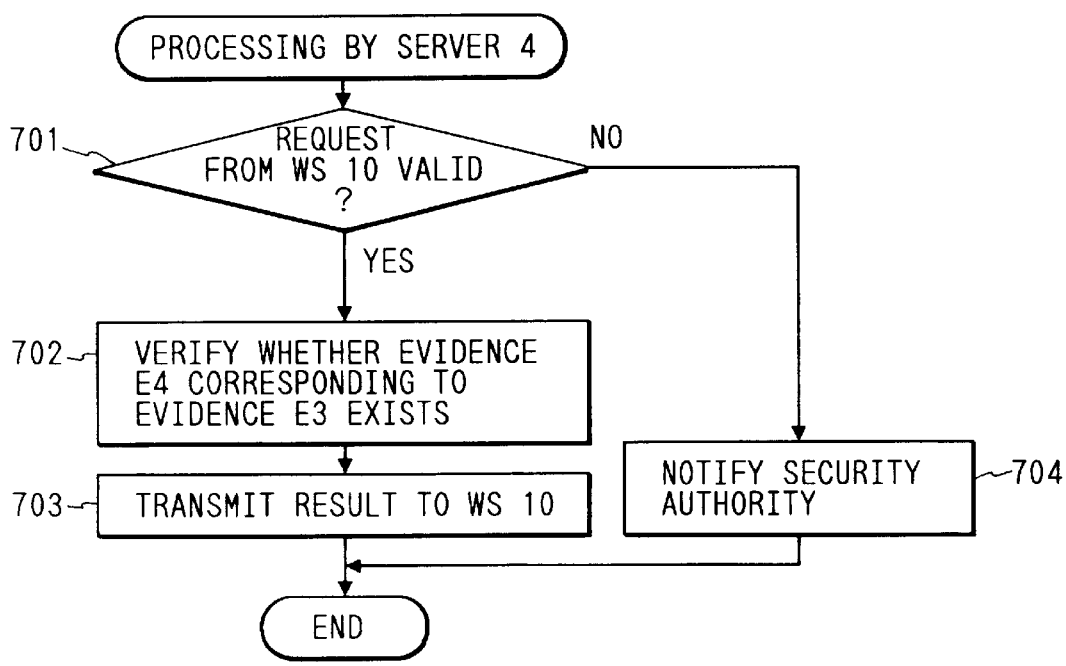
FIG. 18 is a flowchart of steps constituting the process in which to verify the evidence E4 attesting to the reception of the message M2.

FIG. 17 is a view illustrating the process in which the second embodiment verifies evidence E4 attesting to the reception of the message E2. If a message processing discrepancy occurs and results in a dispute between the WS 10 and the WS 20, the processing of FIG. 17 is carried out for verification. What takes place in the setup of FIG. 17 will now be described in more detail with reference to the flowchart of FIG. 18. Although the evidence verifying server 3 is generally responsible for this verification process, the message control server 4 may take over the process instead. (FIGS. 17 and 18 show an example in which the message control server 4 carries out the verification process.) When the AP 13 on the WS 10 requests the evidence verifying server 3 to verify the evidence E4, the evidence verifying server 3 checks to see if that request is valid (step 701). If the request is found to be valid, the evidence verifying server 3 receives the evidence E3 and verifies whether there exists evidence E4 corresponding to the evidence E3 (step 702). The result of the verification is returned to the WS 10 (step 703). If the request is found to be invalid in step 701, the security authority is notified thereof (step 704).

Figure 19:
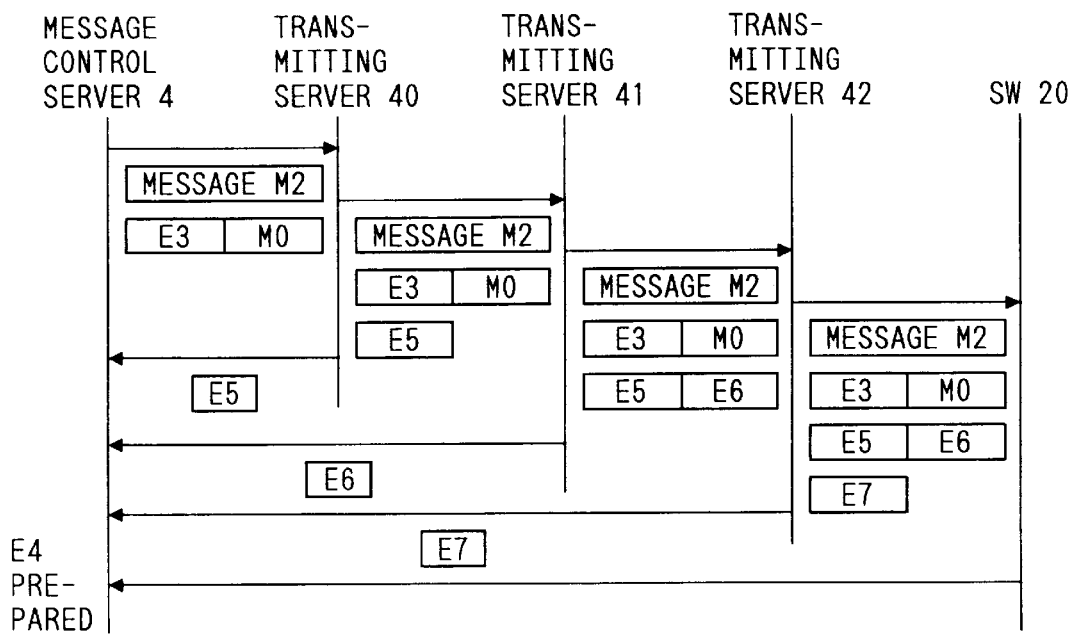
FIG. 19 is a view outlining the process in which the second embodiment prepares evidence attesting to the transmission of a message from a message control server 4 to a plurality of transmitting servers 40 through 42.
Figure 20:
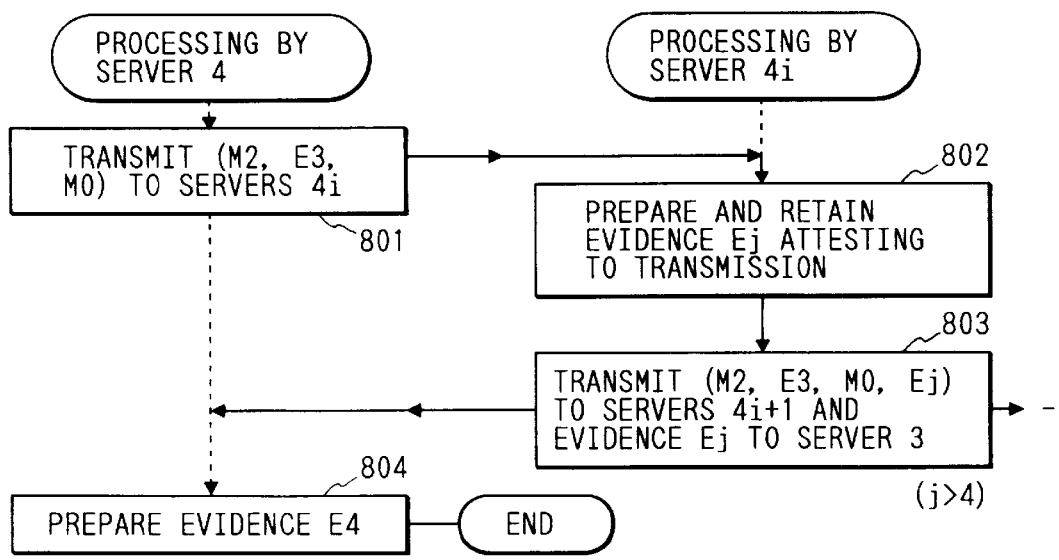
FIG. 20 is a flowchart of steps constituting the process in which to prepare the evidence attesting to the transmission of a message from the message control server 4 to the multiple transmitting servers 40 through 42.

FIG. 19 is a view outlining the process in which the second embodiment prepares evidence attesting to the transmission of a message from the message control server 4 to a plurality of transmitting servers 40 through 42. The processing of FIG. 19 is the same as that of FIG. 12 in terms of interposing the message control server 4 between the transmitting and the receiving terminal. What makes the processing of FIG. 19 different from that of FIG. 12 is that the former involves the use of a plurality of transmitting servers for the actual transmission and reception of messages. The message control server 4 must prepare evidence information upon verifying the transmission and reception of any message between these transmitting servers. What takes place in the setup of FIG. 19 will now be described with reference to the flowchart of FIG. 20. The message control server 4 transmits to transmitting servers 4i (i=0–2) the message M2 furnished with the evidence E3 and management information MO (step 801). The transmitting servers 4i are each a server with a transmitting and receiving (i.e., repeating) function and an evidence preparation and storage function. As such, the transmitting servers 4i prepare evidence Ej (j=5–7) attesting to the transmission of the message and store that evidence (step 802). The evidence Ej thus prepared is returned to the message control server 4, and the message M2 is sent to the transmitting servers $4i_{+1}$ (step 803). The message control server 4 prepares the evidence E4 based on the returned evidence Ej (step 804). The procedure above allows the message control server 4 to manage and verify in a comprehensive manner the routes through which the message M2 passed.

With the second embodiment, the transmitting terminal requests the receiving terminal to prepare and verify the evidence E1 through evidence E3. Alternatively, the receiving terminal may request the transmitting terminal to do the same.

As described, the message control server 4 intervenes in the transmission of a message from the WS 10 to the WS 20. By way of such intervention, the message control server 4 prepares evidence attesting both to the message transmission from the transmitting terminal and to the message reception by the receiving terminal. This makes it impossible not only for the transmitting terminal to deny it ever issued the message M2; it also makes it impossible for the receiving terminal to claim that it never received the message M2 for such putative reasons as a network system error.

The above embodiments utilize encryption in preventing malicious or unscrupulous attempts to forge or falsify evidence information. Alternatively, the hash function may be employed to provide against tampering.

The above embodiments use evidence information attesting to the transmission and reception of a message effected by the transmitting and the receiving terminal (WS 10 and WS 20), respectively. An alternative embodiment may use security information for verifying the security of a message to be sent from the transmitting terminal to the receiving terminal. In that case, the embodiment includes security information preparing means (corresponding to the evidence preparing server 2) for preparing security information attesting to the security of the message to be sent from the transmitting terminal, the preparation being effected upon receipt of a request for such security information. The security information thus prepared is retained by the preparing means, and is also transmitted to the transmitting terminal. The embodiment further includes verifying means for verifying whether particular security information is valid upon receipt of a request from either the transmitting or the receiving terminal for verification of the security information in question. If the security information is found to be valid, that information is retained, and the other terminal is notified of the result of the verification.

Another alternative embodiment may comprise control means (corresponding to the message control server 4) for control on the exchanges of messages between a plurality of terminals, on the security information preparing means, and on the verifying means. The kinds of control involved pertain to the preparation of receipt information attesting to the reception of a message by the receiving terminal, to the request for the preparing means to prepare security information, and to the request for the verifying means to verify security information and exchange-related information.

As described, the message guaranty system according to the invention offers the following advantages:

(1) According to the message guaranty system of the invention, any message sent from the transmitting terminal to the receiving terminal is furnished with evidence information which, prepared by the reliable third party, attests to the transmission and reception of that message. The highly reliable evidence information demonstrates unfailingly whether a particular message was actually delivered from one party to another, thereby guaranteeing the security of the message in question. This feature permits accurate, discrepancy-free exchanges of messages between the parties concerned and facilitates the resolution of any message-related dispute therebetween.

(2) The evidence information preparing means of the invention prepares evidence information on the basis of such message-related information as the transmitter identifier, the receiver identifier, the time of message transmission and the message length. Analyzing this evidence information provides a highly accurate verdict on the disputed message.

(3) The evidence information converting means of the invention converts the evidence information into an encryption format or other suitable form that will thwart any malicious or unscrupulous attempts to forge or falsify that information. This feature allows the inventive system to attest to the transmission and reception of any message with more certainty than ever.

(4) The delayed delivery means of the invention may be used to transmit a message along with its evidence information from the evidence server comprising that means directly to the receiving terminal on behalf of the transmitting terminal. Acting as it does, the delayed delivery means offers more secure delivery of messages between the transmitting and the receiving terminal.

(5) If a message-related dispute occurs between a plurality of communicating terminals and if these terminals request verification of the evidence information regarding the disputed message, the verification means of the third parts verifies the authenticity of the evidence information in question.

As many apparently different embodiments of this invention may be made without departing from the spirit and scope thereof, it is to be understood that the invention is not limited to the specific embodiments thereof except as defined in the appended claims.

What is claimed is:

1. A message guaranty system connected with a plurality of terminals on a network, comprising:

message delivery means for delivering a message from a transmitting terminal to a receiving terminal;

evidence information preparing means for preparing by a third party evidence information attesting to the transmission and reception of said message and storing the evidence information in a first memory; and evidence information furnishing means for appending to said message delivered from said transmitting terminal to said receiving terminal, said evidence information prepared by said evidence information preparing means;

means, included in said transmitting terminal, for transmitting said evidence information to said receiving terminal through said message delivery means; and evidence information verifying means for accepting from the receiving terminal a message containing evidence information received by the receiving terminal, for receiving from the evidence information preparing means and storing in a second memory the evidence information prepared by said evidence information preparing means, for comparing the evidence information contained in the received message with the evidence information stored in said second memory, and for sending to the receiving terminal, if the evidence information in the received message is determined to correspond to the evidence information stored in said second memory, data attesting that said received message is the message that was transmitted by the transmitting terminal.

2. A message guaranty system according to claim 1, wherein said evidence information preparing means prepares second evidence information attesting that the message transmitted from the transmitting terminal was received in the receiving terminal;

wherein said evidence information verifying means receives from said evidence information preparing means said second evidence information and then stores said second evidence information in said second memory in a manner so that the second evidence information corresponds to the evidence information stored therein; and wherein said evidence information verifying means further receives said evidence information from the transmitting terminal, determines whether there is stored in said second memory second evidence information corresponding to said evidence information, and transmits to the transmitting terminal, if second evidence information corresponding to the evidence information prepared by the evidence information preparing means is stored in said second memory, data attesting that the message which was transmitted to the receiving terminal has been received in the receiving terminal.

3. A message guaranty system according to claim 2, wherein, if second evidence information corresponding to said evidence information is not stored in said second memory, said evidence information verifying means notifies a security authority.

4. The message guaranty system according to claim 1, wherein said evidence information preparing means and said evidence information verifying means are integrated in a single integral unit.

5. A message guaranty system according to claim 4, wherein said single integral unit stands as a third party on the same network as the transmitting and receiving terminals.

6. A message guaranty system according to claim 1, wherein, if said evidence information in the message received by the receiving terminal is determined not to be equal to the evidence information transmitted by said transmitting terminal, said evidence information verification system notifies a security authority.

7. A method for communicating a message in a manner that will guarantee transfer of said message from a first workstation to a second workstation, said first and second workstations being connected to one another by a network, said method comprising the steps of:

transmitting a first request signal from the first workstation to a first server requesting said first server to prepare a first type of evidence information for identifying said message to be transmitted from the first workstation to the second workstation;

generating in the first server said first type of evidence information based at least in part on contents of said message;

storing said first type of evidence information in said first server;

transmitting said first type of evidence information to a second server for storage therein;

appending said first type of evidence information to said message;

transmitting said message with said appended evidence information to the second workstation via said network;

receiving in said second workstation a message containing evidence information;

sending the evidence information in the message received in said second workstation from said second workstation to said second server;

comparing in said second server the evidence information in said message received in said second workstation with the first type of evidence information stored in said second server; and sending from the second server to the second workstation, if the evidence information in the message received in said second workstation is determined to be equal to the first type of evidence information stored in said second server, data attesting that said message received in said second workstation is the message that was transmitted by said first workstation.

8. The method recited in claim 7, further comprising the steps of:

sending a second request signal from said second server to the first server requesting said first server to prepare a second type of evidence information attesting that the message transmitted from the first workstation was received in the second workstation;

generating in said first server said second type of evidence information;

storing in said first server said second type of evidence information;

transmitting from said first server to said second server said second type of evidence information for storage in said second server, said second server storing said second type of evidence information in a manner so that said second type of evidence information corresponds to the first type of evidence information stored in said second server;

receiving in said second server said first type of evidence information from the first workstation;

determining whether said second server has stored therein second type of evidence information corresponding to said first type of information;

transmitting from said second server to the first workstation, if second type of evidence information corresponding to said first type of evidence information is stored in said second server, data attesting that the message which was transmitted to the second workstation has been received in said second workstation.

9. The method recited in claim 8, further comprising the step of:

notifying a security authority if second type of evidence information corresponding to said first type of evidence information is not stored in said second server.

10. A method as recited in claim 8, further comprising the step of:

notifying a security authority if said second request signal is invalid.

11. The method of claim 7, further comprising the step of:

notifying a security authority if the evidence information in the message received by said second workstation is determined not to be equal to the first type of evidence information stored in said second server.

12. The method as recited in claim 7, further comprising the step of:

notifying a security authority if said first request signal is invalid.

13. A system for communicating a message in a manner that will guarantee transfer of said message from a first workstation to a second workstation, comprising:

communication means for connecting the first workstation to the second workstation;

first server means for generating, when requested by the first workstation, a first type of evidence information based at least in part on contents of said message, for storing the first type of evidence information in a first memory located therein, and for transmitting said first type of evidence information to the first workstation;

means, included in said first workstation, for appending said first type of evidence information transmitted thereto to said message;

means, included in said first workstation, for transmitting said message with the appended evidence information to the second workstation via said communication means; and second server means for accepting from the second workstation a message containing evidence information which was received in the second workstation, for receiving from said first server means and storing in a second memory said first type of evidence information, for comparing the evidence information contained in said message received in the second workstation with the first type of evidence information stored in said second memory, and for sending to the second workstation, if the evidence information in the message received in the second workstation is determined to be equal to the first type of evidence information, data attesting that said message received in the second workstation is the message that was transmitted by the first workstation.

14. The system recited in claim 13, wherein said first server means prepares and then stores in said first memory a second type of evidence information when requested to do so by said second server means, said second type of evidence information attesting that the message transmitted from the first workstation was received in the second workstation; and wherein said second server means receives from said first server means said second type of evidence information and then stores said second type of evidence information in said second memory in a manner so that the second type of evidence information corresponds to the first type of evidence information stored therein, said second server means then receiving said first type of evidence information from the first workstation, determining whether there is stored in said second memory second type of evidence information corresponding to said first type of evidence information, and transmitting to the first workstation, if second type of evidence information corresponding to said first type of evidence information is stored in said second memory, data attesting that the message which was transmitted to the second workstation has been received in said second workstation.

15. The system recited in claim 14, wherein the second server means includes means for notifying a security authority if second type of evidence information corresponding to said first type of evidence information is not stored in said second memory.

16. The system of claim 13, wherein said second server means includes means for notifying a security authority if the evidence information in the message received by said second workstation is determined not to be equal to said first type of evidence information.

17. The system recited in claim 13, wherein said first server means and said second server means are integrated in a single integral unit.

18. The system recited in claim 17, wherein said single integral unit stands as a third party in relation to said first and second workstations.

19. A method for communicating a message in a manner that will guaranty transfer of said message from a first workstation to a second workstation, said first and second workstations being connected to one another by a network, said method comprising the steps of:

generating in a first server a first type of evidence information for identifying said message to be transmitted from the first workstation to the second workstation, said first type of evidence information being based at least in part on contents of said message;

storing said first type of evidence information in said first server;

transmitting said first type of evidence information to a second server for storage therein;

appending said first type of evidence information to said message;

transmitting said message with said appended evidence information to the second workstation via said network;

receiving in said second workstation a message containing evidence information;

sending the evidence information and the message received in said second workstation from said second workstation to said second server;

comparing in said second server the evidence information in said message received in said second workstation with the first type of evidence information stored in said second server; and sending from the second server to the second workstation, if the evidence information in the message received in said second workstation is determined to be equal to the first type of evidence information stored in said second server, data attesting that said message received in said second workstation is the message that was transmitted by said first workstation.

20. The method recited in claim 19, further comprising the steps of:

generating in said first server a second type of evidence information attesting that the message transmitted from the first workstation was received in the second workstation;

storing in said first server said second type of evidence information;

transmitting from said first server to said second server said second type of evidence information for storage in said second server, said second server storing said second type of evidence information in a manner so that said second type of evidence information corresponds to first type of evidence information stored in said second server;

receiving in said second server said first type of evidence information from the first workstation;

determining whether said second server has stored therein second type of evidence information corresponding to said first type of evidence information; and transmitting from said second server to the first workstation, if second type of evidence information corresponding to said first type of evidence information is stored in said second server, data attesting that the message which was transmitted to the second workstation has been received in the second workstation.

21. The method recited in claim 20, further comprising the steps of:

sending a second request signal from said second server to the first server requesting said first server to prepare said second type of evidence information.

22. The method recited in claim 19, further comprising the steps of:

transmitting a first request signal from the first workstation to a first server requesting said first server to prepare said first type of evidence information.

\* \* \* \* \*